US012752631B2

(12) United States Patent
Erdman et al.

(10) Patent No.: US 12,752,631 B2
(45) Date of Patent: Oct. 6, 2026

(54) SOLAR POWERED VEHICLE

(71) Applicants: Hunter C. Erdman, Royal Oak, MI (US); Courtney S. Jiggetts, Clinton, MD (US)

(72) Inventors: Hunter C. Erdman, Royal Oak, MI (US); Courtney S. Jiggetts, Clinton, MD (US)

(73) Assignee: Fisher & Paykel Healthcare Limited, Auckland (NZ)

( * ) Notice: Subject to any disclaimer, the term of this patent is extended or adjusted under 35 U.S.C. 154(b) by 364 days.

(21) Appl. No.: 18/613,242

(22) Filed: Mar. 22, 2024

(65) Prior Publication Data

US 2024/0317064 A1 Sep. 26, 2024

Related U.S. Application Data

(60) Provisional application No. 63/491,856, filed on Mar. 23, 2023.

(51) Int. Cl.
*B60L 8/00* (2006.01)
*B60K 1/04* (2019.01)

(52) U.S. Cl.
CPC ................ *B60L 8/003* (2013.01); *B60K 1/04* (2013.01); *B60K 2001/0411* (2013.01); *B60K 2001/0455* (2013.01); *B60L 2200/22* (2013.01)

(58) Field of Classification Search
CPC ....... B60L 8/003; B60L 2200/22; B60K 1/04; B60K 2001/0411; B60K 2001/0455
See application file for complete search history.

(56) References Cited

U.S. PATENT DOCUMENTS

| | | | | | |
|---|---|---|---|---|---|
| 4,181,188 | A * | 1/1980 | Dessert | B62M 6/60 | 180/2.2 |
| RE31,156 | E * | 2/1983 | Dessert | B60K 1/04 | 180/2.2 |
| 7,017,685 | B2 * | 3/2006 | Schoenberg | B60K 16/00 | 180/2.1 |
| 7,243,746 | B1 * | 7/2007 | Vasant | B62D 11/04 | 180/21 |
| 7,884,569 | B2 * | 2/2011 | Ward | B60L 8/003 | 180/2.2 |
| 8,701,800 | B2 * | 4/2014 | Hui | B60K 16/00 | 180/2.2 |
| 10,080,318 | B2 * | 9/2018 | Ricci | B60L 53/126 | |
| 10,603,997 | B2 * | 3/2020 | Bergstrom | B60G 3/08 | |
| 12,214,835 | B2 * | 2/2025 | Bollinger | B60K 1/04 | |

(Continued)

FOREIGN PATENT DOCUMENTS

| | | | | |
|---|---|---|---|---|
| WO | WO-2017083851 | A1 * | 5/2017 | H02J 7/50 |
| WO | WO-2023228125 | A1 * | 11/2023 | B60P 1/6427 |

*Primary Examiner* — Jacob B Meyer
(74) *Attorney, Agent, or Firm* — Knobbe, Martens, Olson & Bear, LLP

(57) ABSTRACT

Provided herein is a vehicle. The vehicle can include a tubular frame, a base plate, a battery assembly, a solar panel system, four wheels, a motor in electrical communication with the battery, one or more body panels, and one or more attachable accessories. The tubular frame can include a base frame, a body frame, and a roof frame. The battery assembly can include a sealing case and a battery within the sealing case. The solar panel system can be removably attached to the roof frame and be in electrical communication with the battery.

20 Claims, 10 Drawing Sheets

(56) References Cited

U.S. PATENT DOCUMENTS

| | | | | |
|---|---|---|---|---|
| 2019/0105991 | A1* | 4/2019 | Bucknell | B60L 8/003 |
| 2021/0221446 | A1* | 7/2021 | Kristofek | B62D 31/003 |
| 2024/0300584 | A1* | 9/2024 | Anattasakul | B62D 25/04 |
| 2024/0317064 | A1* | 9/2024 | Erdman | B60K 16/00 |
| 2025/0115147 | A1* | 4/2025 | Hentz | H02S 20/30 |
| 2026/0109211 | A1* | 4/2026 | Kemp | B60J 7/11 |

* cited by examiner

SOLAR POWERED VEHICLE

CLAIM OF PRIORITY

This application claims priority under 35 USC § 119(e) to U.S. Patent Application Ser. No. 63/491,856, filed on Mar. 23, 2023, the entire contents of which are hereby incorporated by reference.

FIELD OF DISCLOSURE

The present disclosure relates to a solar powered vehicle, for example solar powered golf carts.

BACKGROUND

Recently, there has been a significant motivation to convert traditional gasoline powered vehicles to electric vehicles. In the golf cart industry, many carts are now electric. However, electric carts experience many difficulties. For example, electric carts have shorter run times due to charging constraints. Further, electric carts still rely on grid power, which requires fossil fuels like coal and natural gas to generate electricity. To overcome these difficulties, solar panels can be used to charge the battery and provide continuous charging. However, current efforts to integrate solar panels have fallen short due to inadequate designs which do not provide a significant charge to the battery.

Further, many electric vehicles have integrated components that require significant downtime for repair. For example, many electric vehicles have integrated batteries and frames that require specialized tools to remove, repair, and replace.

Therefore, there is a need for solar powered carts with increased runtimes and decreased repair times.

SUMMARY

Provided herein is a vehicle. The vehicle can include a tubular frame, a base plate, a steerable axle and a rear axle, a battery assembly, a solar panel system, a pair of front wheels, a steering wheel, a pair of rear wheels, a motor, one or more body panels, and one or more attachable accessories. The tubular frame can include a base frame, a body frame extending vertically from the base, and a roof frame extending horizontally from the body. The base plate can be attached to the base frame. The steerable axle and/or rear axle can be operably coupled to the base plate and/or base frame. The battery assembly can include a sealing case and a battery within the sealing case. The battery assembly can be operable to be removably secured to the base plate. The solar panel system can be removably attached to the roof frame. The solar panel system can extend radially outward from the roof frame and be in electrical communication with the battery. The pair of front wheels can be attached to the steerable axle. The steering wheel can be operable to control the pair of front wheels. The pair of rear wheels can be attached to the rear axle. The motor can be in communication with the battery and the steerable axle and/or rear axle. The motor can be operable to rotate the pair of front wheels and/or the pair of rear wheels. The one or more body panels can be operable to be removably attached to the tubular frame. The one or more attachable accessories can be operable to be removably attached to the tubular frame.

In some aspects, the solar panel system can include a top portion covering the roof frame and two curved portions extending radially outward from the top portion and down towards the base frame. In some aspects, the battery assembly can be removable and hot-swappable. In some aspects, the one or more body panels can include one or more attachment mechanisms operable to removably couple the one or more body panels to the tubular frame. In some aspects, the one or more attachment mechanisms can be one or more clamps configured to removably couple to the tubular frame. In some aspects, the vehicle can include a windshield attached to the body frame. In some aspects, the battery assembly can be secured to the base plate in front of the windshield.

In some aspects, the vehicle can include at least one seat extending upward from the base plate behind the windshield. In some aspects, the sealing case can enclose the battery, a battery control unit, a vehicle control unit, a solar inverter, an on board charger, and a low voltage inverter. In some aspects, the vehicle can include one or more wheel covers removably coupled to the vehicle and operable to cover the pair of front wheels and the pair of rear wheels. In some aspects, the vehicle can include a gear shift lever located on a dashboard in a horizontal orientation and in communication with the motor, the gear shift lever operable to shift the motor between two or more gears. In some aspects, the vehicle can include an adjustable rearview mirror attached to the roof frame and adjustable along a vertical curvilinear path.

Further provided herein is a vehicle. The vehicle can include a tubular frame, a base plate, a steerable axle and a rear axle, a battery assembly, a solar panel system, a pair of front wheels, a steering wheel, a pair of rear wheels, a motor, one or more body panels, and one or more attachable accessories. The tubular frame can include a base frame, a body frame extending vertically from the base frame, and a roof frame extending horizontally from the body frame. The base plate can be operable to be attached to the base frame. The steerable axle and/or rear axle can be operably coupled to the base plate and/or base frame. The battery assembly can include a sealing case and a battery within the sealing case, the battery assembly operable to be removably secured to the base plate. The battery assembly can be removable and hot-swappable. The solar panel system can be removably attached to the roof frame. The solar panel system can extend radially outward from the roof frame and in electrical communication with the battery. The solar panel system can include a top portion covering the roof frame and two curved portions extending radially outward from the top portion and down towards the base frame. The pair of front wheels can be attached to the steerable axle. The steering wheel can be operable to control the pair of front wheels. The pair of rear wheels can be attached to the rear axle. The motor can be in communication with the battery and the steerable axle and/or rear axle. The motor can be operable to rotate the pair of front wheels and/or the pair of rear wheels. The one or more body panels can be operable to be removably attached to the tubular frame. The one or more attachable accessories can be operable to be removably attached to the tubular frame.

In some aspects, the one or more body panels can include one or more attachment mechanisms operable to removably couple the one or more body panels to the tubular frame. In some aspects, the one or more attachment mechanisms can be one or more clamps configured to removably couple to the tubular frame. In some aspects, the vehicle can include a windshield attached to the body frame. In some aspects, the battery assembly can be secured to the base plate in front of the windshield. In some aspects, the vehicle can include one or more wheel covers, wherein the one or more wheel covers are operable to be removably coupled to the vehicle. In some aspects, the vehicle can include a gear shift lever located near the windshield and in communication with the motor, the gear shift lever can be operable to shift the motor between two or more gears. In some aspects, the vehicle can include an adjustable rearview mirror attached to the roof frame and adjustable along a vertical curvilinear path.

Other aspects and iterations of the invention are described more thoroughly below.

BRIEF DESCRIPTION OF FIGURES

The description will be more fully understood with reference to the following figures and graphs, which are presented as various embodiments of the disclosure and should not be construed as a complete recitation of the scope of the disclosure. It is noted that, for purposes of illustrative clarity, certain elements in various drawings may not be drawn to scale. Understanding that these drawings depict only exemplary embodiments of the disclosure and are not therefore to be considered limiting of its scope, the principles herein are described and explained with additional specificity and detail through the use of the accompanying drawings in which.

Reference characters indicate corresponding elements among the views of the drawings. The headings used in the figures do not limit the scope of the claims.

DETAILED DESCRIPTION

Figure 1A:
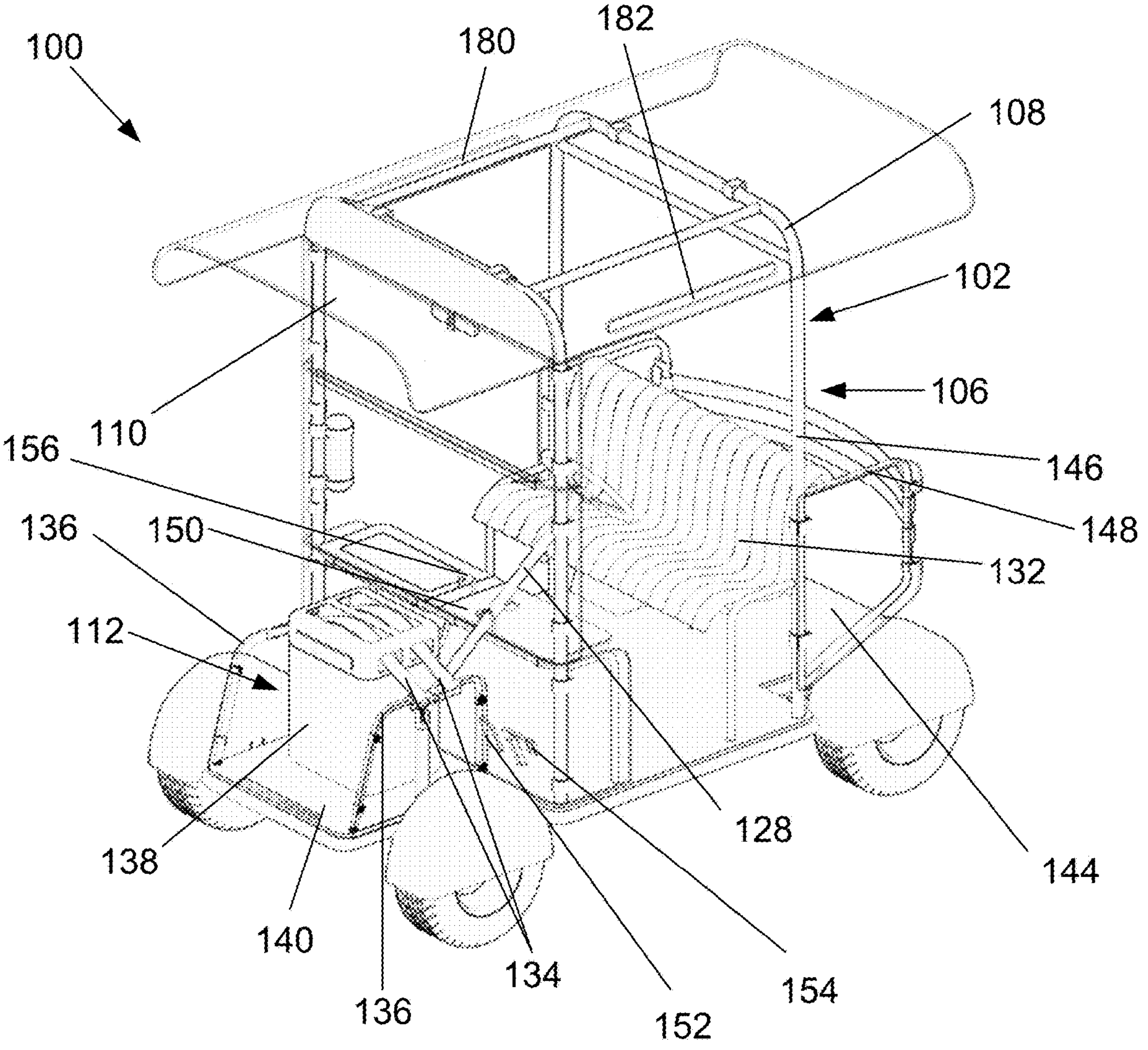
FIG. 1A illustrates a vehicle in one example.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and such references mean at least one of the embodiments.

Reference to "one embodiment", "an embodiment", or "an aspect" means that a particular feature, structure, or characteristic described in connection with the embodiment is included in at least one embodiment of the disclosure. The appearances of the phrase "in one embodiment" or "in one aspect" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

As used herein, "about" refers to numeric values, including whole numbers, fractions, percentages, etc., whether or not explicitly indicated. The term "about" generally refers to a range of numerical values, for instance, ±0.5-1%, ±1-5% or ±5-10% of the recited value, that one would consider equivalent to the recited value, for example, having the same function or result.

The term "substantially" is defined to be essentially conforming to the particular dimension, shape or other word that substantially modifies, such that the component need not be exact.

The terms "comprising," "including" and "having" are used interchangeably in this disclosure. The terms "comprising," "including" and "having" mean to include, but not necessarily be limited to the things so described.

The terms "coupled" and "attached" as used herein is defined as connected, whether directly or indirectly through intervening components, and is not necessarily limited to physical connections. The connection can be such that the objects are permanently connected or releasably connected.

The term "hot-swappable" means that a component can be removed and replaced without significant downtime of the vehicle described herein. For example, hot-swappable can mean that a component can be removed and replaced within about one minute to about fifteen minutes.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

Provided herein is a solar powered vehicle. In some examples, the solar powered vehicle can be a cart, such as a golf cart. The solar powered vehicle can also be a modular vehicle. Modular means that various components of the vehicle can be removable allowing for ease of customization and/or repair. The vehicle can include a tubular frame, a base plate, a battery assembly, a solar panel system, a pair of front wheels, a steering wheel, a pair of rear wheels, a motor in electrical communication with the battery assembly and operable to rotate the pair of front wheels and/or the pair of rear wheels, one or more body panels, and one or more attachable accessories. The vehicle described herein provides numerous advantages including an optimized solar panel system which improves run time and a modular vehicle design allowing for easy customization and repair.

Typical electric powered vehicles, such as golf carts, have various disadvantages. For example, electric golf carts are typically manufactured with weld fixtures and/or jigs to secure various protective panels and accessories. These weld fixtures and/or jigs require specialized tools to remove the various components, thereby making repair and customization burdensome. Further, many electric golf carts have batteries in compartments underneath the seat of the golf cart. While placing the batteries underneath the seat provides for protection from weather and collisions, this configuration also makes it extremely difficult to remove the batteries and repair them. Additionally, the batteries cannot be easily swapped for charged batteries, thereby requiring significant downtime while the batteries are charged. The vehicle described herein overcomes these limitations by providing easily removable components and battery assemblies.

Figure 1B:
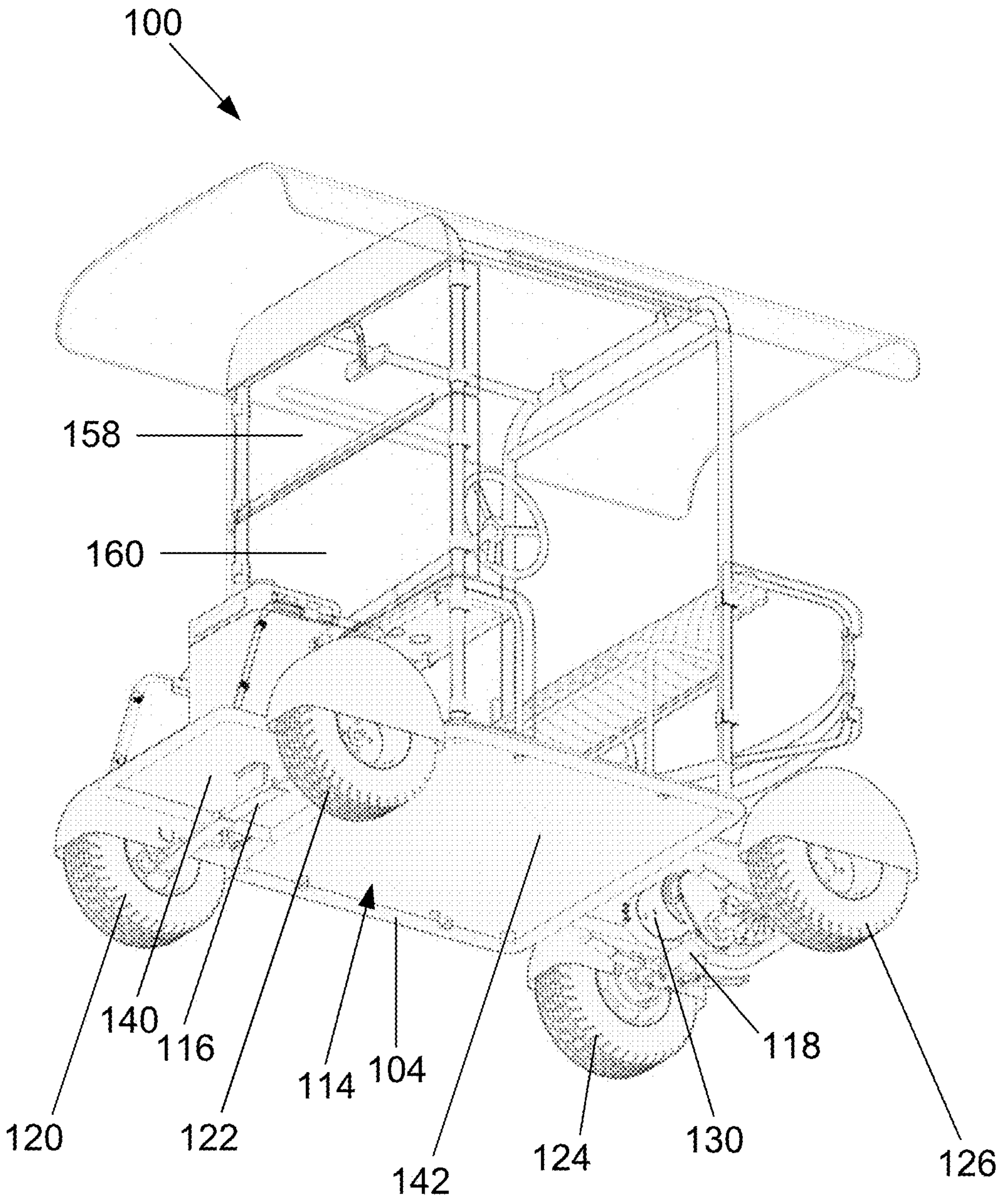
FIG. 1B illustrates a vehicle in one example.
Figure 2:
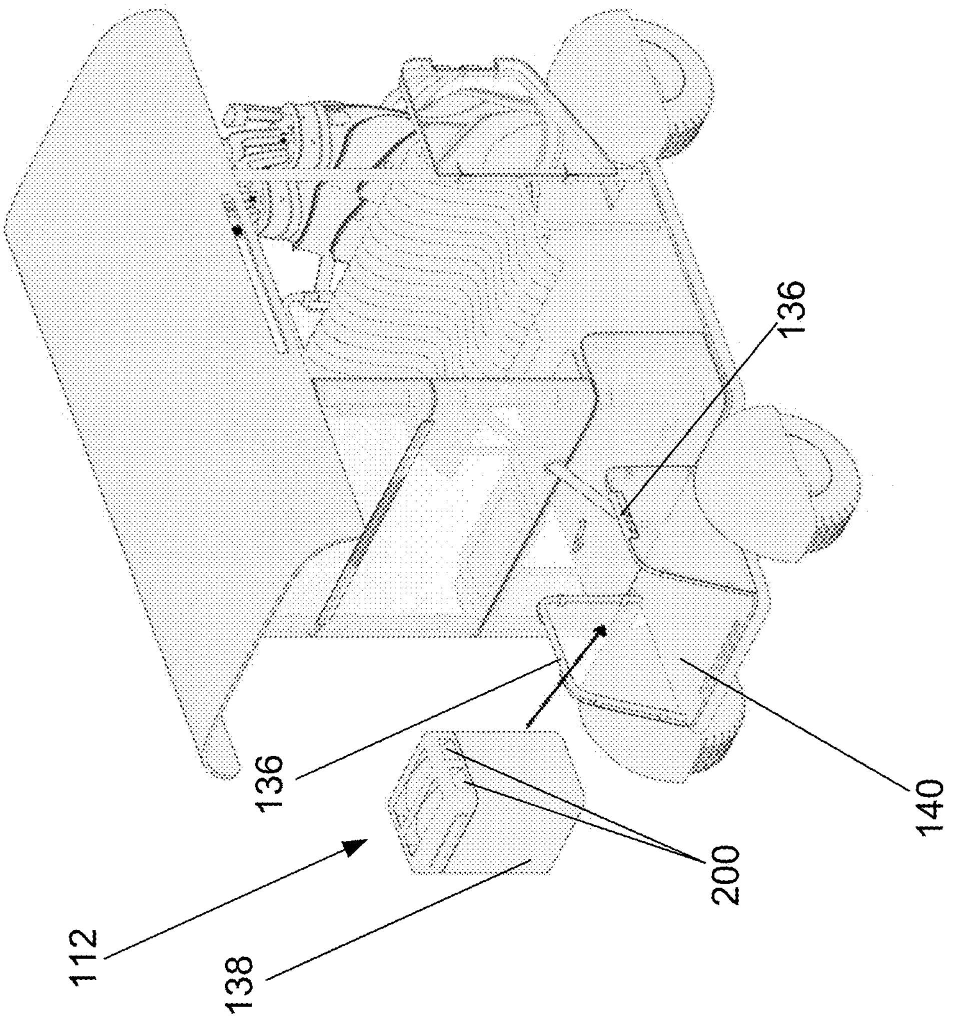
FIG. 2 illustrates a battery assembly and a vehicle in one example.
Figure 3:
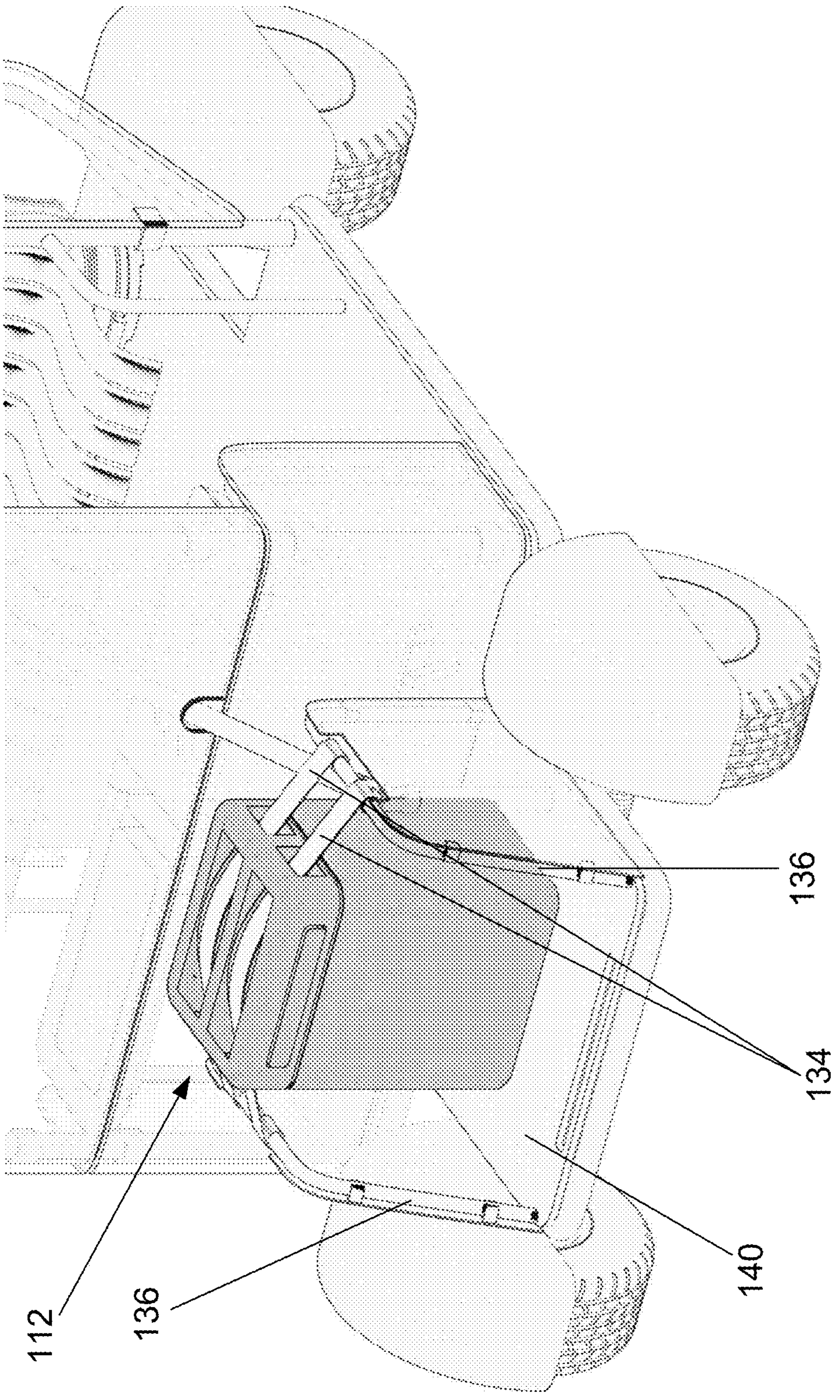
FIG. 3 illustrates a battery assembly secured to a vehicle in one example.

FIGS. 1A-1B illustrate the vehicle 100 in one example. The vehicle 100 can have a tubular frame 102 (e.g., chassis) upon which all components are attached. The tubular frame 102 allows for various modifications of the vehicle. For example, the shape of the tubular frame 102 allows for easy attachment by various components including panels, accessories, a solar panel system, windshields, and other components described herein. The tubular frame 102 can include a base frame 104, a body frame 106, and a roof frame 108. The base frame 104, body frame 106, and roof frame 108 can form the structure for attachment of the various components of the vehicle 100. The body frame 106 can extend vertically upward from the base frame 104. The roof frame 108 can extend horizontally from the body frame 106.

As illustrated in FIGS. 1A-1B, the body frame 106 can include a front body frame 136, an occupant body frame 146, and a rear body frame 148. The front body frame 136 can be operable to surround a battery assembly 112. The front body frame 136 can be located in front of a dashboard 150 and windshield. The front body frame 136 can provide support for securing the battery to the front of the vehicle 100, as described further herein. The front body frame 136 can also provide attachment points for one or more body panels and/or one or more attachable accessories. The occupant body frame 146 can surround an occupant seating area of vehicle (e.g., behind the dashboard 150). The occupant body frame 146 can support the roof frame 108. The occupant body frame 146 can provide attachment points for one or more body panels and/or one or more attachable accessories. In some examples, the occupant body frame 146 can also allow for attachment of a windshield and the dashboard 150. The occupant body frame 146 can also provide attachment points for at least one seat 132. The rear body frame 148 can surround a rear storage area of the vehicle 100. The rear body frame 146 can provide attachment points for one or more body panels and/or one or more attachable accessories.

In some examples, the base frame 104, body frame 106, and roof frame 108 are manufactured as a single component. In some examples, the base frame 104, body frame 106, and roof frame 108 are manufactured as separate components and connected together (e.g., welded). The tubular frame 102 can be constructed from a lightweight material such as aluminum. In some examples, the tubular frame can have sufficient strength to operate as a roll cage if the vehicle 100 tips over (e.g., rolls). In some examples, the tubular frame 102 can have an interior hollow portion. Various wires and electrical connections can be made through the hollow portion of the tubular frame 102, thereby allowing the wires and electrical connections to be protected as well as providing a more aesthetically pleasing vehicle 100.

The vehicle 100 can further include a base plate 114. The base plate 114 can be coupled to the base frame 104 of the tubular frame 102. In some examples, the base plate 114 can be substantially flat. The base plate 114 covers the base frame 104 from the front of the vehicle 100 to the rear of the vehicle 100. The base plate 114 can have a front portion 140, an occupant portion 142, and a rear portion 144. The base plate 114 can also have various attachment ports for attachment of removable accessories. For example, the base plate 114 can have attachment ports for attaching at least one seat 132. The base plate 114 can also have attachment ports for attaching storage containers (e.g., coolers, boxes, etc.). In some examples, the attachment ports in the base plate 114 can include snap fit connectors, clips, hooks/handles for securing straps to, or other types of attachment ports. The attachment ports can be configured for securing different items to the vehicle 100 and can be customizable. For example, a user may want specific snap fit connectors in the rear portion 144 of the base plate 114 for securing a cooler and/or golf bag that has corresponding snap fit connectors, such that the user can secure the cooler and/or golf bag to the rear portion 144 of the base plate 114. In some examples, the front portion 140 of the base plate 114 can have attachment ports for attaching the battery assembly 112.

The vehicle 100 can be configured such that the base plate 114 is continuously unimpeded by any components from a rear end of the vehicle to the dashboard 150. While typical electric golf carts utilize a battery storage area under the seat, thereby impeding the open base plate, the vehicle 100 described herein provides a continuously unimpeded base plate 114, thereby allowing for additional storage capacity within the vehicle 100.

In some examples, the at least one seat 132 can include multiple rows of seats staggered throughout the vehicle 100. For example, the at least one seat 132 can be two rows of seats, three rows of seats, or more. In some examples, the at least one seat 132 can include a first seat facing in a forward direction (e.g., towards the dashboard 150) and a second set facing towards the rear end of the vehicle 100. The at least one seat 132 can be extend upward from the base plate behind the dashboard 150 and windshield. In some examples, the at least one seat 132 can be a bench configured to allow seating for two or more people. In some examples, the at least one seat 132 can include a driver's chair and a passenger's chair that are separated by a gap. It will be appreciated that the at least one seat 132 can be any kind of seat operable to allow a user to sit on. In some examples, the at least one seat 132 can be made out of leather. In some examples, the at least one seat 132 can be made out of mycelium which is durable and biodegradable.

The vehicle 100 can further include a windshield. In some examples, the windshield can include a lower windshield 160 and an upper windshield 158. The windshield can be configured to prevent debris or other objects from striking a user when the user is operating the vehicle 100. In some examples, the upper windshield 158 and lower windshield 160 cover the front facing portion of an occupant area (e.g., between the dashboard 150 and the at least one seat 132) from the dashboard 150 to the roof frame 108. In some examples, the upper windshield 158 and/or lower windshield 160 can be moveable such that a user can slide the upper windshield 158 and/or lower windshield 160 vertically up or down as desired. The upper windshield 158 and/or lower windshield 160 can be removably coupled to the body frame 106 using one or more attachment mechanisms (e.g., snap fit, clamps, etc.). In some examples, the one or more attachment mechanisms can be one or more clamps operable to removably couple to the tubular frame 102 when a force is supplied to the one or more clamps. The upper windshield 158 and/or lower windshield 160 can be removed from the tubular frame 102 by pulling on the upper windshield 158 and/or lower windshield 160, thereby causing the clamps to uncouple from the tubular frame.

The vehicle 100 can include a front axle 116 (e.g., steerable axle) and a rear axle 118. The front axle 116 can be coupled to the front portion 140 of the base plate 114 and/or a front portion of the base frame 104. The rear axle 118 can be coupled to the rear portion 144 of the base plate 114 and/or a rear portion of the base frame 104. A pair of front wheels (e.g., first front wheel 120 and second front wheel 122) can be removably coupled to the front axle 116. A pair of rear wheels (e.g., first rear wheel 124 and second rear wheel 126) can be removably coupled to the rear axle 118. A steering wheel 128 can be coupled to the front axle 116. The steering wheel 128 can be operable to move the front axle 116, thereby moving the first front wheel 120 and the second front wheel 122. The steering wheel 128 can control the first front wheel 120 and the second front wheel 122. In some examples, the steering wheel 128 can control the orientation of the first front wheel 120 and the second front wheel 122. In this manner, a user can steer the vehicle 100 by rotating the steering wheel 128.

The vehicle 100 can include a motor 130. The motor 130 can be coupled (e.g., in mechanical communication) to the rear axle 118 and be operable to rotate the rear axle 118, thereby rotating the first rear wheel 124 and the second rear wheel 126. In some examples, the motor 130 can be coupled to the front axle 116 and be operable to rotate the front axle 116, thereby rotating the first front wheel 120 and the second front wheel 122. In some examples, the motor 130 can be coupled to both the front axle 116 and the rear axle 118. The motor 130 can rotate both the front axle 116 and the rear axle 118, thereby rotating the first front wheel 120, the second front wheel 122, the first rear wheel 124, and the second rear wheel 126. The vehicle 100 can be front wheel drive (e.g., the first front wheel 120 and the second front wheel 122 are driven by the motor 130), rear wheel drive (e.g., the first rear wheel 124 and the second rear wheel 126 are driven by the motor 130), or four wheel drive (e.g., the first front wheel 120, the second front wheel 122, the first rear wheel 124, and the second rear wheel 126 are driven by the motor 130).

The vehicle 100 can further include a motor pedal 152 and brake pedal 154. The motor pedal 152 can be operable to actuate the motor 130 based on an input (e.g., compression) provided by the user to the motor pedal 152. Each of the front axle 116 and the rear axle 118 can include one or more brake mechanisms (e.g., brake pads) that can slow and/or stop the rotation of the front axle 116 and the rear axle 118 when the brake mechanisms compress the front axle 116 and/or rear axle 118. The brake mechanisms can be actuated based on an input (e.g., compression) provided by the user to the brake pedal 154. The vehicle can further include a shift lever 156 (e.g., gear shift lever). The shift lever 156 can be operable to shift the motor 130 between gears. For example, the shift lever 156 can have a forward gear operable to cause the motor 130 to drive the vehicle 100 to move in a forward direction. The shift lever 156 can also have a reverse gear operable to cause the motor 130 to drive the vehicle 100 in a reverse direction. In some examples, the shift lever 156 can be operable to shift the motor 130 between multiple forward gears, multiple reverse gears, and a neutral gear.

Figure 6:
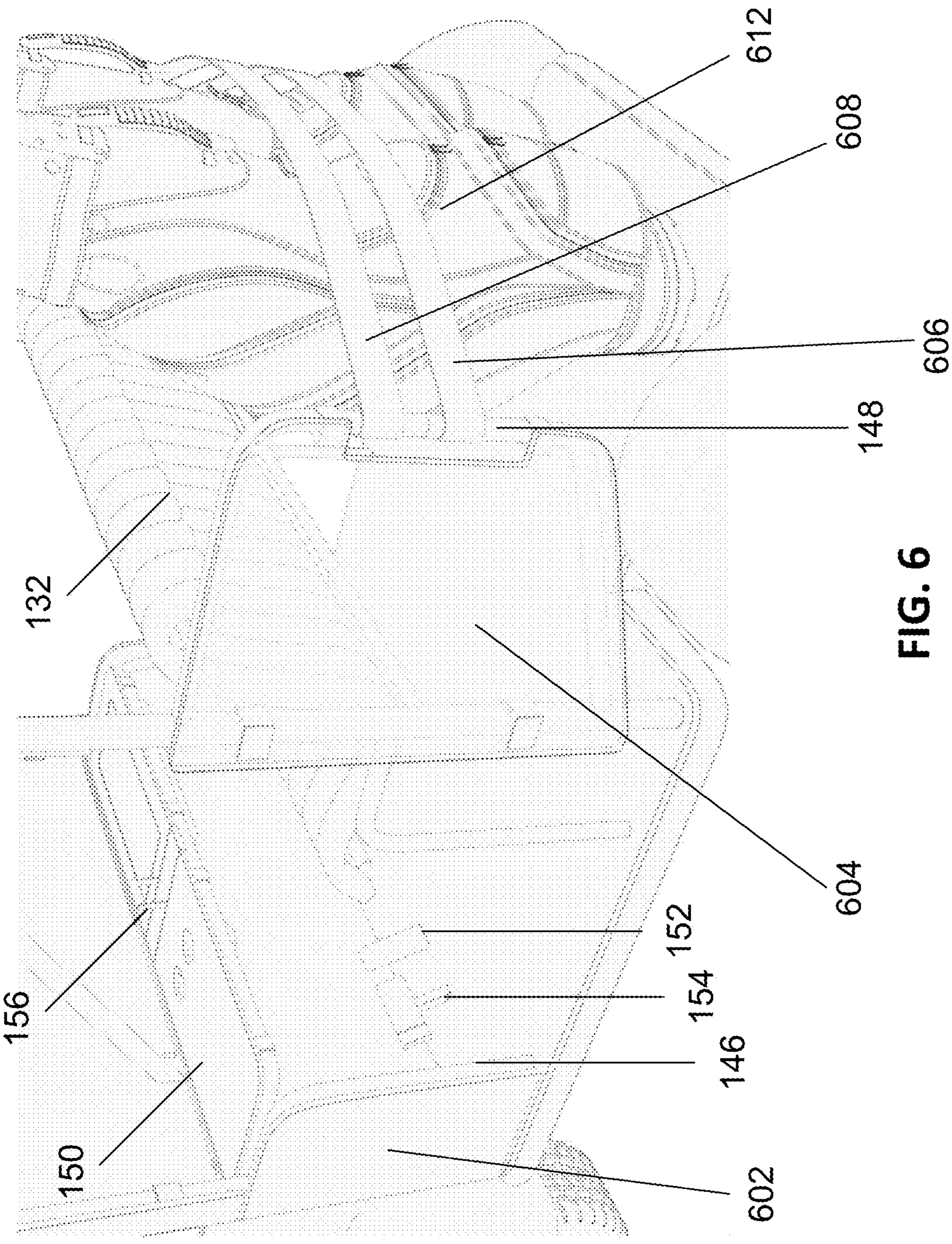
FIG. 6 illustrates one or more body panels attached to a vehicle in one example.
Figure 9:
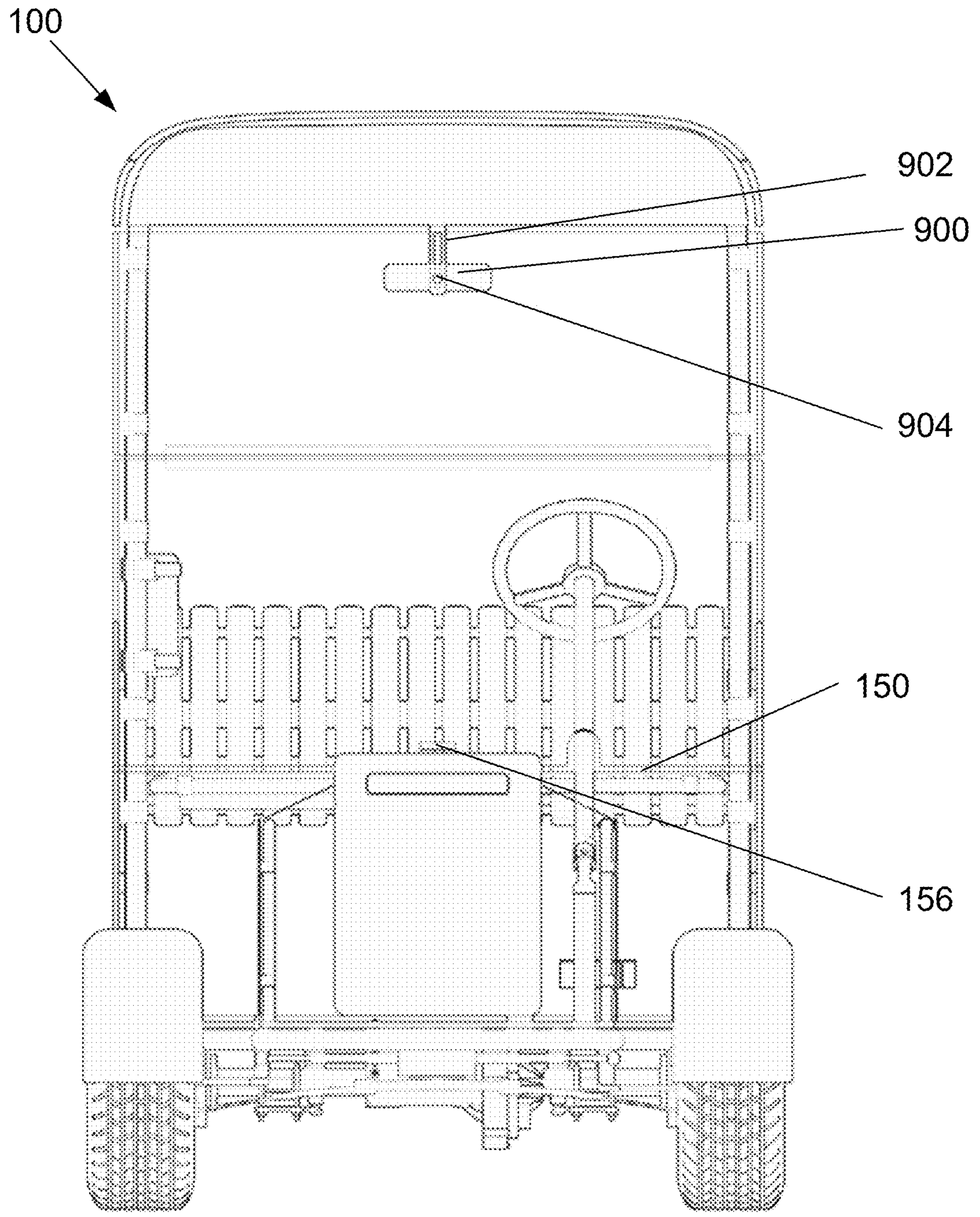
FIG. 9 illustrates a vehicle in one example.

In some examples, as illustrated in FIGS. 1A, 6, and 9, the shift lever 156 can be located on the dashboard 150. In typical electric vehicles, such as electric golf carts, the gear shift lever is located in a vertical position underneath the seat to reduce distance to the battery. However, by locating the gear shift lever in a vertical position underneath the seat, the user's legs can hit the gear shift lever, thereby causing unexpected and dangerous gear shifting. The shift lever 156 of the vehicle 100 is located on the dashboard 150 and operable to move in a horizontal direction (e.g., located in a horizontal orientation), thereby ensuring that unexpected gear shifting does not occur. As described herein, the battery location is near the dashboard 150, thereby allowing the shift lever 156 to be located on the dashboard 150.

As illustrated in FIGS. 1A-1B, 2, and 3, the vehicle 100 can include a battery assembly 112. The battery assembly 112 can be located at the front of the vehicle 100 for easy removal and be configured to decrease the weight of the vehicle 100, thereby increasing the efficiency of the vehicle 100. The battery assembly 112 can be in electrical communication (e.g., via wires) with the motor 130. The battery assembly 112 can also be in electrical communication (e.g., via wires) with the solar panel system described herein. The battery assembly 112 can be configured to power the motor 130 and other components of the vehicle (e.g., radio, lights, etc.). The battery assembly 112 can be charged during use by the solar panel system described herein. The battery assembly 112 can be modular, hot-swappable, removable, and repairable. The battery assembly 112 can include a battery, a battery control unit, a vehicle control unit, a solar inverter, an on board charger, and a low voltage inverter. By including all of the components necessary to operate the vehicle 100, the battery assembly 112 allows for easy repair when a component fails. For example, in traditional electric vehicles, the components are not self-contained, such that in order for the vehicle to be operable, a single component may need to be replaced. The battery assembly 112 described herein can simply be swapped for another battery assembly 112 when an issue arises, thereby significantly reducing downtime of the vehicle 100. The battery assembly 112 can be sealed and self-contained within a case 138 (e.g., sealing case) such that it is protected from weather and other potential damage. The battery assembly 112 can include all of the electronic devices necessary to operate the vehicle 100. The battery assembly 112 can be a self-contained, swapable control and power assembly. The battery assembly 112 allows for easy removal and replacement, such that when the weather is poor and the battery is not able to be charged by the solar panel system described herein, the battery assembly 112 can simply be swapped out for another battery assembly 112 without any significant downtime.

The battery can be operable to power the motor 130. The battery control unit can be operable to control the amount of power provided by the battery to the motor 130. The vehicle control unit can be operable to control the vehicle 100 (e.g., control the motor 130 based on the inputs from the motor pedal 152 and/or shift lever 156). The solar inverter can be configured to convert the solar radiation from the solar panel system to electrical energy for use by the battery. The on board charger can be configured to charge the battery with the energy from the solar panel system described herein. The low voltage inverter can be configured to convert the voltage from the battery to be provided to the motor 130 and/or convert the voltage from the solar inverter to be provided to the battery.

A significant benefit of the vehicle 100 described herein is the location of the battery assembly 112. The location where the battery assembly 112 is attached to the vehicle 100 can provide for easy removal and repair and also allow the battery assembly 112 to be hot-swappable. Typically, electric vehicles (e.g., golf carts) store batteries underneath an occupant seat. When the batteries are stored under the occupant seat, the batteries are protected from weather and other possible issues. However, the batteries are very difficult to remove because the of the tight space between the occupant seat and the batteries. The battery assembly 112 described herein overcomes these difficulties. The battery assembly 112 can be secured to a front portion 140 of the base plate 114 at the front of the vehicle 100 between the front body frame 136, as illustrated, for example, in FIGS. 2-3. The battery assembly 112 can be secured to the base plate 114 via one or more attachment mechanisms. In some examples, the one or more attachment mechanisms can include one or more straps 134 configured to couple to a front body frame 136. The one or more straps 134 can be placed through one or more openings 200 on the case 138 of the battery assembly 112. The one or more straps 134 can have securing mechanisms (e.g., clips, clamps, etc.) on the ends of the one or more straps 134. The securing mechanisms can be operable to secure the battery assembly 112 to the front body frame 136. The one or more straps 134 can have adjustable lengths such that once the one or more straps 134 are secured within the case 138 and to the front body frame 136, the one or more straps 134 can be tightened, thereby securing the battery assembly 112 to the front portion 140 of the base plate 114. In other examples, the front portion 140 of the base plate 114 can have attachment ports (e.g., snap fit ports, clamps, handles for securing clamps, or other attachment mechanisms) operable to secure to corresponding attachment mechanisms (e.g., snap fit connecters, handle for securing clamps, or other attachment mechanisms) of the battery assembly 112. It will be appreciated that any kind of attachment means can be used to secure the battery assembly 112 to the front portion 140 of the base plate 114.

The battery assembly 112 can be in electrical communication with the motor 130 for powering the motor 130. The battery assembly 112 can also be in communication with the motor pedal 152, such that when the motor pedal 152 receives a user input to actuate the motor 130, the battery assembly 112 can supply power to the motor 130. In some examples, the communication between the battery assembly 112 and the motor 130 can be wired communication. One or more wires can be connected to the battery assembly 112, the motor 130, and the motor pedal 152 to establish communication between the battery assembly 112, the motor 130, and the motor pedal 152. In some examples, one or more wires can be protected from weather, collisions, and other interferences by being placed through the hollow portion of the tubular frame 102. The shift lever 156 can also be in communication with the battery assembly 112 and/or the motor 130 for controlling the gear of the motor 130. It will be appreciated that other electronic components (e.g., radios, lights, etc.) can similarly be connected to the battery assembly 112 by wires running through the tubular frame 102.

In some examples, the battery assembly 112 can have a length, width, and height configured such that the battery assembly 112 is easily moveable by a user. In some examples, the battery assembly 112 can have a length of about 5 inches to about 10 inches, about 10 inches to about 15 inches, about 15 inches to about 20 inches, about 20 inches to about 25 inches, or more. In some examples, the battery assembly 112 can have a width of about 5 inches to about 10 inches, about 10 inches to about 15 inches, about 15 inches to about 20 inches, about 20 inches to about 25 inches, or more. In some examples, the battery assembly 112 can have a height of about 5 inches to about 10 inches, about 10 inches to about 15 inches, about 15 inches to about 20 inches, about 20 inches to about 25 inches, or more.

In some examples, the battery assembly 112 can have a weight that is substantially less than typical electric vehicle batteries. For example, the battery assembly 112 can have a weight of 10 pounds or less, about 10 pounds to about 15 pounds, about 15 pounds to about 20 pounds, about 20 pounds to about 25 pounds, about 25 pounds to about 30 pounds, about 30 pounds to about 35 pounds, about 35 pounds to about 40 pounds, about 40 pounds to about 45 pounds, or about 45 pounds to about 50 pounds. The reduced weight of the battery assembly 112 as compared to other electric vehicles (e.g., electric golf carts) increases the speed of the vehicle 100.

Figure 4:
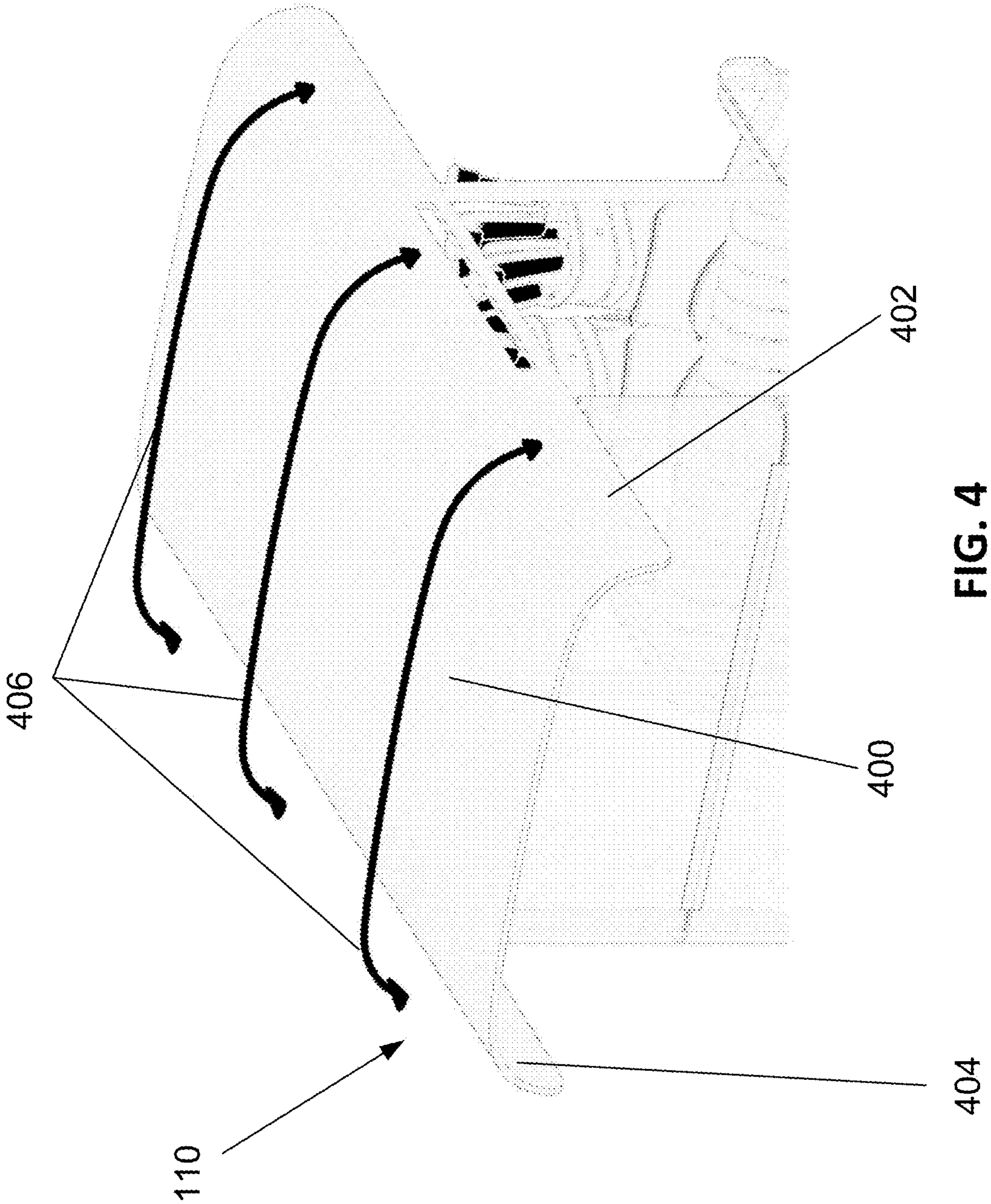
FIG. 4 illustrates a solar panel system in one example.

The vehicle 100 can include a solar panel system 110 that also acts as a roof covering the interior of the vehicle 100. In some examples, the solar panel system 110 can be curvilinear such that the solar panel system 110 can capture solar radiation from a plurality of angles. The solar panel system 110 can include one or more solar panel materials (e.g., photovoltaic panels or other materials) configured to capture solar radiation and provide the solar radiation to the battery assembly 112. The battery assembly 112 can convert the solar radiation into electrical energy to power the vehicle 100. As illustrated in FIG. 1A, the solar panel system 110 can extend radially outward from the roof frame 108 of the tubular frame 102 both in width and in length. As illustrated in FIG. 4, the solar panel system 110 can include a top portion 400 and two curved side portions 402, 404. The two curved side portions 402, 404 can extend radially outward from the top portion 400 and downward towards the base plate 114 and base frame 104. The top portion 400 and the two curved side portions 402, 404 can be manufactured as a single continuous solar panel. In some examples, the top portion 400 can also have a curvature configured to increase surface area (e.g., a curvilinear top portion 400), thereby increasing the exposure to solar radiation. The solar panel system 110 can be configured such that the solar panel system 110 is optimized to receive sunlight from all directions. The arrows 406 generally track the curvature of the solar panel system 110 in one example. The solar panel system 110 can be configured such that the solar panel system 110 has a maximized surface area, thereby allowing for maximum reception of sunlight at all angles. In some examples, the front and rear ends of the solar panel system 110 can also be curved, thereby further increasing surface area of the solar panel system 110. For example, the front and rear ends of the solar panel system 110 can be curved similar to the curved portions 402, 404 of the sides. In this example, the solar panel system 110 can form a dome-like structure over the roof frame 108 of the tubular frame, further increasing the surface area of the solar panel system 110.

The solar panel system 110 can have one or more attachment mechanisms for attaching to the roof frame 108 of the tubular frame 102. For example, the solar panel system 110 can have clips, snap fit mechanisms, clamps, or other attachment means for coupling to the roof frame 108 of the tubular frame 102. In some examples, the solar panel system 110 can have clamps configured to snap fit directly on to the roof frame 108 of the tubular frame 102. In this manner, the solar panel system 110 is easily attached to the roof frame 108 and can be easily detached from the roof frame 108 if necessary. For example, a user may want to swap a solar panel system 110 for another solar panel system 110 due to upgrades in solar panel technology, damage to the solar panel system 110, or for other reasons. The attachment mechanisms allow for easy removal and replacement of the solar panel system 110.

In some examples, the solar panel system can include slots 180, 182, as illustrated, for example, in FIG. 1A. The slots 180, 182 can be handlebar slots that provide a gripping handle for a user when entering and/or exiting the vehicle 100. In some examples, the slots 180, 182 can also provide a gripping handle for removing and/or attaching the solar panel system 110 to the roof frame 108. Alternatively, the slots 180, 182 can be replaced with handles that extend outward from the solar panel system 110.

In some examples, the solar panel system 110 can have a length of about 20 inches to about 25 inches, about 25 inches to about 30 inches, about 30 inches to about 35 inches, about 35 inches to about 40 inches, about 40 inches to about 45 inches, about 45 inches to about 50 inches, about 50 inches to about 55 inches, about 55 inches to about 60 inches, about 60 inches to about 65 inches, about 65 inches to about 70 inches, about 70 inches to about 75 inches, about 75 inches to about 80 inches, about 80 inches to about 85 inches, about 85 inches to about 90 inches, about 90 inches to about 95 inches, about 95 inches to about 100 inches, about 100 inches to about 105 inches, about 105 inches to about 110 inches, about 110 inches to about 115 inches, about 115 inches to about 120 inches, about 120 inches to about 125 inches, about 125 inches to about 130 inches, about 130 inches to about 135 inches, about 135 inches to about 140 inches, about 140 inches to about 145 inches, about 145 inches to about 150 inches, about 150 inches to about 155 inches, about 155 inches to about 160 inches, or more. In some examples, the solar panel system 110 can have a length that covers about 50% to about 60% of the total length of the vehicle 100, about 60% to about 70% of the total length of the vehicle 100, about 70% to about 80% of the total length of the vehicle 100, about 80% to about 90% of the total length of the vehicle 100, about 90% to about 100% of the total length of the vehicle 100, or more.

In some examples, the solar panel system 110 can have a width of about 20 inches to about 25 inches, about 25 inches to about 30 inches, about 30 inches to about 35 inches, about 35 inches to about 40 inches, about 40 inches to about 45 inches, about 45 inches to about 50 inches, about 50 inches to about 55 inches, about 55 inches to about 60 inches, or more. In some examples, the solar panel system 110 can have a width that covers about 50% to about 60% of the total width of the vehicle 100, about 60% to about 70% of the total with of the vehicle 100, about 70% to about 80% of the total width of the vehicle 100, about 80% to about 90% of the total width of the vehicle 100, about 90% to about 100% of the total width of the vehicle 100, about 100% to about 110% of the total width of the vehicle 100, about 110% to about 120% of the total width of the vehicle 100, or more.

In some examples, the top portion 400 of the solar panel system 110 can have a height measured from a peak (e.g., the middle of the top portion 400 at an equal distance from the curved portions 402, 404) as compared to the height at the curved portions 402, 404. For example, when the top portion 400 is curvilinear, the top portion can extend vertically upwards from its edges (e.g., where it connects to the curved portions 402, 404) to a peak (e.g., in the middle of the top portion 400 at an equal distance from the curved portions 402, 404). The height of the top portion 400 can also be measured as a distance between the peak (e.g., middle of the top portion 400 between the two curved portions 402, 404) and the roof frame 108. In some examples, the height can be about 1 inch to about 2 inches, about 2 inches to about 3 inches, about 3 inches to about 4 inches, about 4 inches to about 5 inches, about 5 inches to about 6 inches, about 6 inches to about 7 inches, about 7 inches to about 8 inches, about 8 inches to about 9 inches, about 9 inches to about 10 inches, about 10 inches to about 11 inches, about 11 inches to about 12 inches, about 12 inches to about 13 inches, about 13 inches to about 14 inches, about 14 inches to about 15 inches, about 15 inches to about 16 inches, about 16 inches to about 17 inches, about 18 inches to about 19 inches, about 19 inches to about 20 inches, about 20 inches to about 21 inches, about 21 inches to about 22 inches, about 22 inches to about 23 inches, about 23 inches to about 24 inches, or more. The vertical distance between the solar panel system 110 and the roof frame 108 can gradually increase from the curved portions 402, 404 to the height (e.g., peak) of the top portion 400. In this manner, the solar panel system 110 can have an increased surface area, thereby allowing the solar panel system 110 to more efficiently capture solar radiation from multiple directions.

Figure 5A:
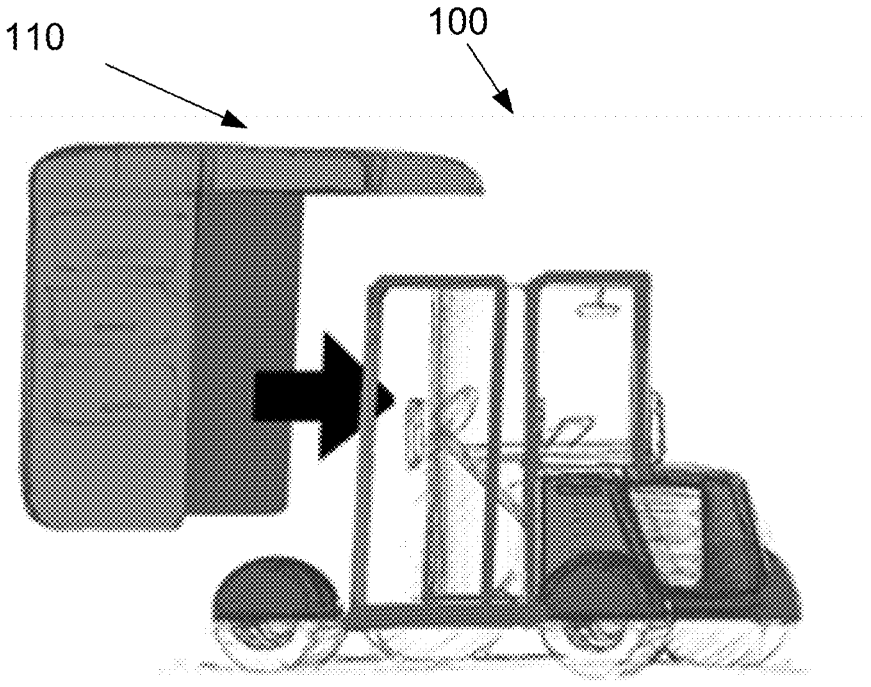
FIG. 5A illustrates a solar panel system in one example.
Figure 5B:
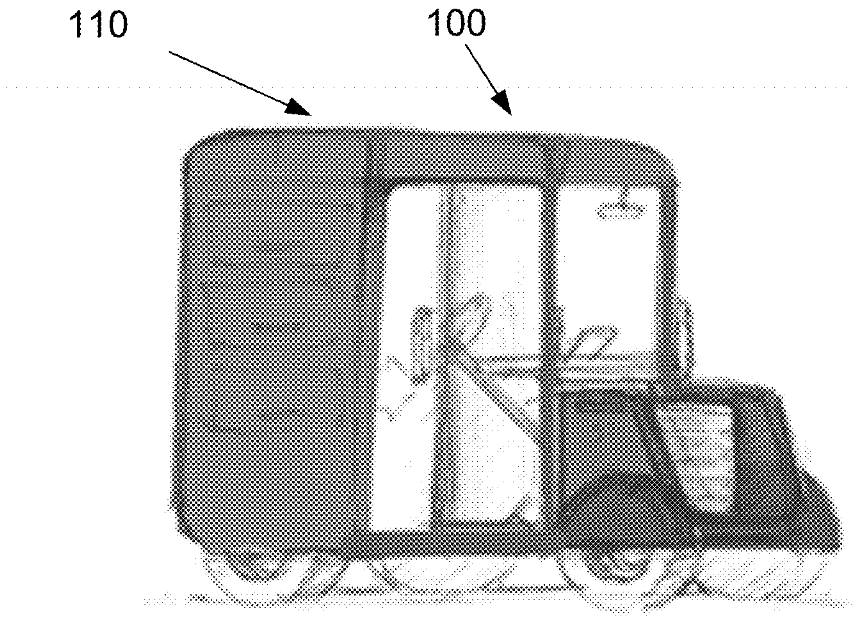
FIG. 5B illustrates a solar panel system in one example.

FIGS. 5A-5B illustrate a solar panel system 110 in another example. In this example, the solar panel system 110 can cover both the roof frame 108 of the tubular frame 102 and rear sides of the vehicle. The solar panel system 110 can have a further increased surface area for exposure to solar radiation.

The solar panel system 110 can be in electrical communication with the battery assembly 112. The solar panel system 110 can be operable to charge the battery in the battery assembly 112. The solar panel system 110 can be wired to the battery through hollow portions of the tubular frame 102. In some examples, the solar panel system 110 is operable to charge the battery sufficiently such that the battery does not need any additional charging from an electrical grid or other electrical power source. The solar panel system 110 is also configured to charge the battery in the battery assembly 112 while the vehicle 100 is in operation. Therefore, the vehicle 100 can be charging while also expending electrical charge. In this manner, the vehicle 100 run time is greatly extended. A major drawback of current electrical vehicles is a low run time. The solar panel system 110 greatly increases the runtime and can be operable to allow the vehicle 100 to operate for hours and even days without having to be shutdown to charge.

In some examples, the vehicle 100 can have a roof that is not a solar panel system. For example, the vehicle can have a plastic, metal, or other type of roof that does not capture solar radiation. The roof can have one or more attachment mechanisms (e.g., snap fit connectors, clamps, etc.) for attaching to the roof frame 108.

Figure 7:
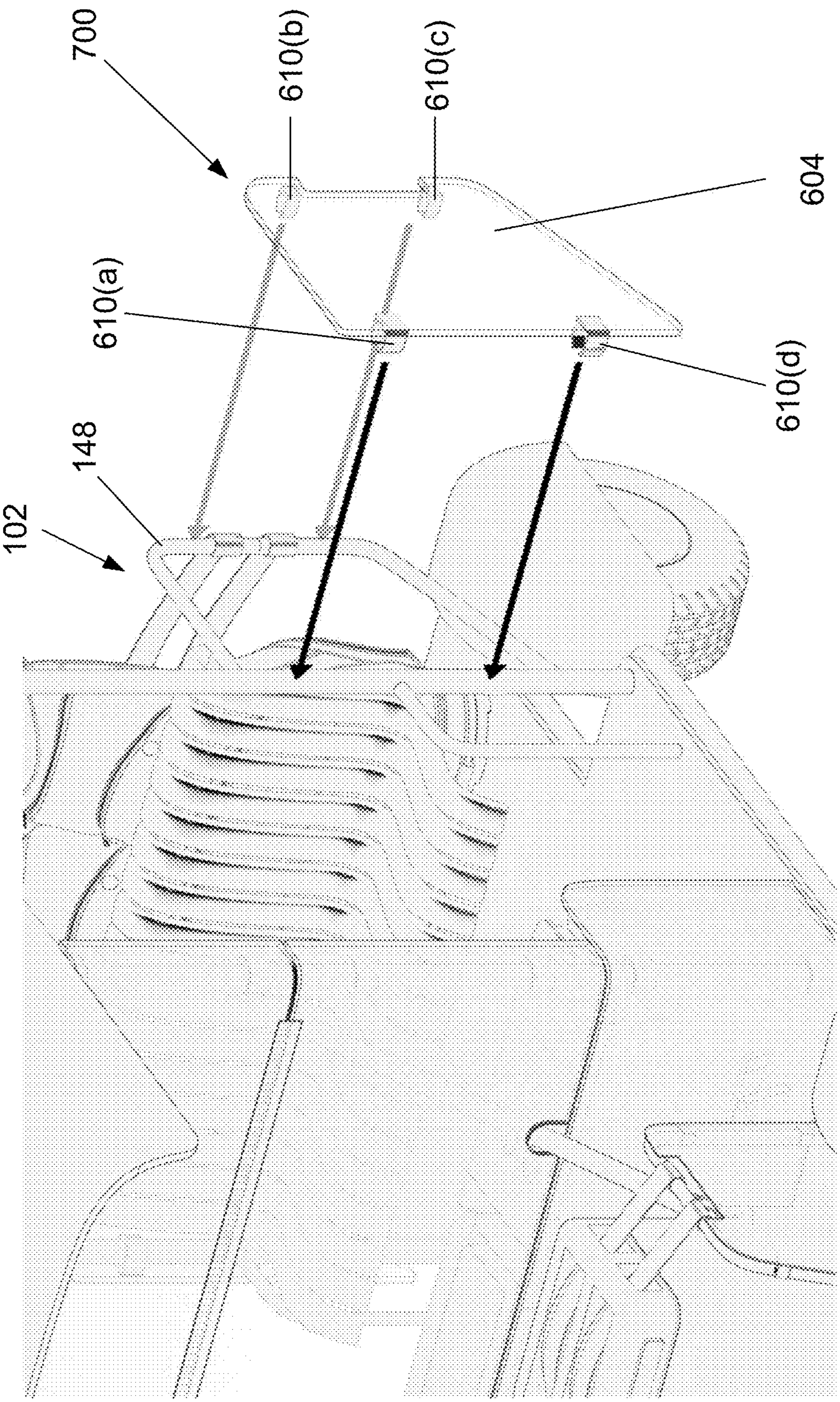
FIG. 7 illustrates a body panel being attached to a vehicle in one example.
Figure 8:
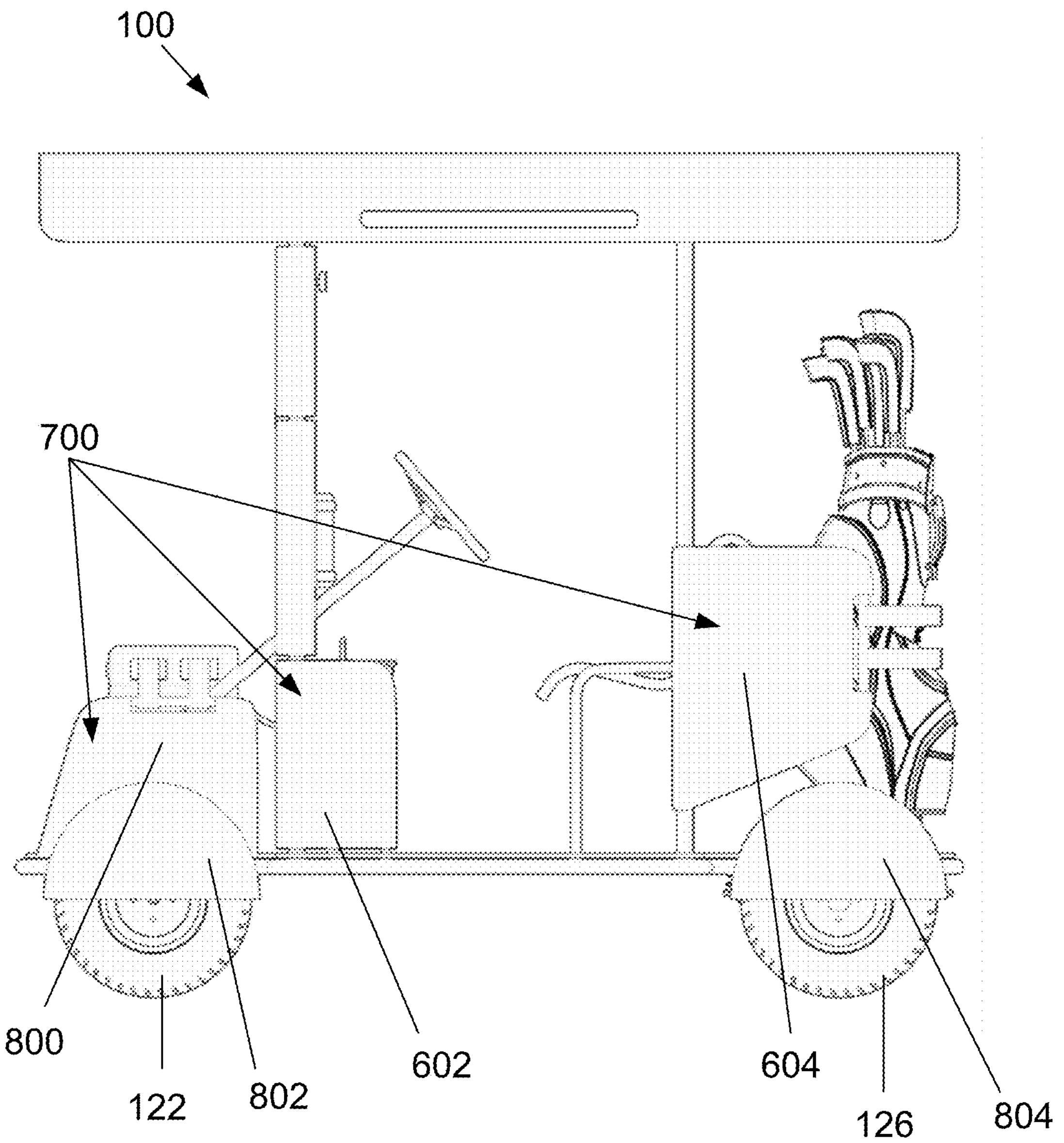
FIG. 8 illustrates a vehicle in one example.

As illustrated in FIGS. 6-8, the vehicle can have one or more body panels 700. The body panels 700 can be modular, meaning the one or more body panels 700 are easily removed and replaced. The one or more body panels can also be customized (e.g., have different sizes, shapes, materials, and functions). Non-limiting examples of the one or more body panels include a rear body panel 604, a front body panel 800, one or more occupant body panels 602, one or more rear body panels 604, one or more wheel covers, and combinations thereof. FIGS. 6-8 show one example of an arrangement of the body panels 700, but other arrangements and configurations are contemplated. In some examples, the one or more body panels 700 can be configured to attach to any portion of the tubular frame 102. The one or more body panels 700 can be configured to enclose any portion of the tubular frame 102, thereby allowing a user to determine the appearance and structure of the vehicle 100. Each of the one or more body panels 700 can have one or more attachment mechanisms. In some examples, the attachment mechanisms can be clamps, snap-fit connectors, or other attachment mechanisms. The attachment mechanisms can be operable to removably couple the one or more body panels 700 to the tubular frame 102. By removably coupling the one or more body panels 700 to the tubular frame 102, the one or more body panels 700 can be easily removed and replaced, thereby allowing greater customization (e.g., size and shape of structural coverage by the one or more body panels 700) of the vehicle 100 as well as easy repair of the vehicle 100. Typical vehicles require tools for removal of body panels, which requires extensive time and effort to repair or customize the body panels. The one or more body panels 700 provided herein allow for quick and easy removal while providing the same structure and functionality of traditional body panels that are secured via screws, welding, or other means.

As illustrated in FIG. 7, the one or more attachment mechanisms can be one or more clamps 610(*a*), 610(*b*), 610(*c*), 610(*d*) operable to removably couple to the tubular frame 102 when a force is supplied to the one or more clamps 610(*a*), 610(*b*), 610(*c*), 610(*d*). The one or more body panels 700 can be removed from the tubular frame 102 by pulling on the one or more body panels 700, thereby causing the clamps to uncouple from the tubular frame 102. The one or more clamps 610(*a*), 610(*b*), 610(*c*), 610(*d*) can be sized such that the one or more clamps 610(*a*), 610(*b*), 610(*c*), 610(*d*) snap on to the tubular frame 102. In some examples, the one or more clamps 610(*a*), 610(*b*), 610(*c*), 610(*d*) can be made of a resilient plastic, such that the one or more clamps 610(*a*), 610(*b*), 610(*c*), 610(*d*) require a force to be pushed on to the tubular frame 102 and be pulled off the tubular frame 102. In this manner, the one or more clamps 610(*a*), 610(*b*), 610(*c*), 610(*d*) can provide a connection with the tubular frame 102 sufficient to hold the one or more clamps 610(*a*), 610(*b*), 610(*c*), 610(*d*) in place once connected, but also allow the one or more clamps 610(*a*), 610(*b*), 610(*c*), 610(*d*) to be removed by providing a sufficient pulling force. It will be appreciated that while the one or more clamps 610(*a*), 610(*b*), 610(*c*), 610(*d*) are shown for attaching the one or more body panels 700, the one or more clamps 610(*a*), 610(*b*), 610(*c*), 610(*d*) can be similarly used to attach the one or more accessories described herein, the solar panel system 110 described herein, or any other components described herein that attach to the tubular frame 102.

In some examples, the one or more body panels 700 can be made out of recycled plastic materials. For example, the one or more body panels 700 can be made out of ocean-derived and ocean-bound plastics.

FIG. 6 illustrates a rear body panel 604 attached to the rear body frame 148. The rear body panel 604 can be removably coupled to the rear body frame 148 via one or more attachment mechanisms. An occupant body panel 602 can be removably coupled to the occupant body frame 146. FIG. 7 illustrates the rear body panel 604 being attached to the rear body frame 148. As illustrated in FIG. 7, a force can be applied (e.g., a user can push the rear body panel 604 towards the rear body frame 148) to the rear body panel 604 to couple the rear body panel 604 to the rear body frame 148. FIG. 8 illustrates a front body panel 800 which is removably coupled to the front body frame 136.

The one or more body panels 700 can provide protection to a user in the vehicle 100. The one or more body panels can also provide protection to the components of the vehicle 100 and/or create storage areas. For example, the front body panel 800 can provide protection to the battery assembly 112 in the event of a collision. Although only one front body panel 800 is shown, the vehicle 100 can include a front body panel 800 on each side of the battery assembly 112. In some examples, the vehicle can further include a third front body panel 800 covering the battery assembly 112 in a forward facing direction (e.g., the vehicle can include three front body panels 800 enclosing the battery assembly 112 with a fourth side being the dashboard 150).

Although only one occupant body panel 602 is shown, the vehicle 100 can have occupant body panels 602 on both sides of the vehicle 100. The occupant body panel 602 can prevent debris or objects from hitting a user when the first front wheel 120 and second front wheel 122 are rotating (e.g., the first front wheel 120 and the second front wheel 122 can cause debris from the ground to be kicked up towards the user). While the occupant body panel 602 is illustrated as a relatively small body panel, it will be appreciated that the occupant body panel 602 can be configured to couple to any portion of the tubular frame 102. For example, the occupant body panel 602 can enclose the entire occupant body frame 146 or any portion thereof. In some examples, the occupant body panel 602 can be operable as a door. For example, one attachment side of the occupant body panel 602 can be rotatably coupled to a portion of the occupant body frame 146. The opposite side of the occupant body panel 602 can be configured to removably couple to an opposite portion of the occupant body frame 146. The occupant body panel 602 can include a handle configured to release the attachment mechanism of the occupant body panel 602 from the opposite side. In this manner, the occupant body panel 602 can be a door.

The rear body panel 604 can be operable to define a storage space in the rear end of the vehicle. It will be appreciated that while only one rear body panel 604 is shown, the vehicle 100 can have two rear body panels 604 on opposing sides of the vehicle. In some examples, the vehicle 100 can include a third rear body panel 604 at the rear end of the vehicle 100 such that three rear body panels 604 enclose a storage area with the at least one seat 132 being the fourth side of the storage area.

In some examples, the one or more body panels 700 (e.g., front body panel 800, occupant body panel 602, and rear body panel 604) can have any length and height as desired by a user. For example, the one or more body panels 700 can have any length and height configured such that the one or more body panels 700 can be attached to the tubular frame 102. In some examples, the one or more body panels 700 can have a length of about 5 inches to about 10 inches, about 10 inches to about 15 inches, about 15 inches to about 20 inches, about 20 inches to about 25 inches, about 25 inches to about 30 inches, about 30 inches to about 35 inches, about 35 inches to about 40 inches, about 40 inches to about 45 inches, about 45 inches to about 50 inches, about 50 inches to about 55 inches, about 5 inches to about 60 inches, or more. In some examples, the one or more body panels 700 can have a height of about 5 inches to about 10 inches, about 10 inches to about 15 inches, about 15 inches to about 20 inches, about 20 inches to about 25 inches, about 25 inches to about 30 inches, about 30 inches to about 35 inches, about 35 inches to about 40 inches, about 40 inches to about 45 inches, about 45 inches to about 50 inches, about 50 inches to about 55 inches, about 55 inches to about 60 inches, or more. The one or more body panels 700 can have any shape.

As illustrated in FIG. 6, the vehicle can further include one or more storage straps 606, 608. The one or more storage straps 606, 608 can be configured to secure items between the rear body panels 604 and the at least one seat 132. For example, as illustrated in FIG. 6, the one or more storage straps 606, 608 can secure one or more golf bags 612. The one or more straps 606, 608 can have one or more attachment mechanisms (e.g., clamps, clips, snap fit connectors, etc.) for securing to the rear body frame 148. The one or more straps 606, 608 can have adjustable lengths such that the one or more straps 606, 608 can be tightened to secure objects in the rear storage area.

As illustrated in FIG. 8, the vehicle 100 can include one or more wheel covers. The wheel covers can be configured to be removably coupled to the base frame 104, the front axle 116, and/or the rear axle 118. The one or more wheel covers can include a first front wheel cover 802 and a first rear wheel cover 804. The first front wheel cover 802 can be configured to cover the second front wheel 122. The first rear wheel cover 804 can be configured to cover the second rear wheel 126. While only the first front wheel cover 802 and the first rear wheel cover 804 are shown, it will be appreciated that the additional wheel covers can be provided to cover the second front wheel 122 and the second rear wheel 126.

Typically, wheel covers are manufactured as part of the body of vehicles. These wheel covers are welded or otherwise secured to the body of the vehicle, thereby causing extensive effort when a wheel cover is damaged or needs to be replaced. The wheel covers 802, 804 provide significant advantages over traditional wheel covers. The wheel covers 802, 804 have attachment mechanisms (e.g., snap fit connectors, the clamps described herein, etc.) which allow for the easy removal of the wheel covers 802, 804. When a wheel cover 802, 804 is damaged, the wheel cover 802, 804 can be easily removed and replaced with a new wheel cover, thereby decreasing the repair time for the vehicle 100.

As illustrated in FIG. 9, the vehicle 100 can include an adjustable mirror 900 (e.g., rearview mirror). The adjustable mirror 900 can be coupled to a vertical arm 902. The vertical arm 902 can extend along a curvilinear path. The height and position of the adjustable mirror 900 can be adjusted by a knob 904. The knob 904 can be configured to rotate to lock and unlock, thereby allowing a user to unlock the knob 904, move the adjustable mirror 900 to a desired position, and lock the knob 904 to set the position of the adjustable mirror 900 along the vertical arm 902.

The vehicle 100 can further include one or more attachable accessories (e.g., radios, speakers, lights, etc.). The one or more accessories can have one or more attachment mechanisms for attaching to the tubular frame 102 of the vehicle 100. For example, the attachment mechanisms can be clamps which snap onto the tubular frame 102 when a force is supplied towards the tubular frame 102. The clamps can be easily removable by pulling on the one or more accessories, thereby applying a force to the clamps, which uncouples the attachment mechanisms from the tubular frame. It will be appreciated that the one or more accessories can be wired to the battery assembly 112 through the tubular frame 102 as necessary.

The vehicle 100 can further include a display. In some examples, the display can be attached to the dashboard 150. The display can display various parameters related to operation of the vehicle 100. For example, the display can be configured to display the speed of the vehicle 100, the battery level of the battery in the battery assembly 112, an amount of charge per a time period (e.g., charging rate) provided by the solar panel system 110 to the battery, or other parameters related to the operation of the vehicle 100. The display can be powered by the battery assembly 112.

The vehicle 100 described herein provides significant advantages over current electric vehicles such as golf carts. For example, the self-contained battery assembly 112 described herein allows users to easily swap out batteries when a battery assembly 112 needs to be repaired, without requiring significant downtime of the vehicle 100. The solar panel system 110 allows for increased capture and conversion of solar radiation to charge the battery assembly 112, thereby increasing runtime of the vehicle 100. The modular nature of the vehicle 100 (e.g., the one or more body panels 700, the one or more accessories, and the wheel covers 802, 804) allows for easy replacement, repair, and customization of the vehicle 100. By locating the battery assembly 112 at the front of the vehicle 100, the storage room of the vehicle 100 is significantly increased since there is no obstruction underneath the at least one seat 132.

The disclosures shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the examples described above may be modified within the scope of the appended claims.

What is claimed is:

1. A vehicle comprising:

a tubular frame comprising:
- a base frame;
- a body frame extending vertically from the base frame; and
- a roof frame extending horizontally from the body frame;

a base plate operable to be attached to the base frame;

a rear axle and a steerable axle operably coupled to the base plate and/or the base frame;

a battery assembly comprising a sealing case and a battery within the sealing case, the battery assembly operable to be removably secured to the base plate;

a solar panel system removably attached to the roof frame, the solar panel system extending radially outward from the roof frame and in electrical communication with the battery;

a pair of front wheels attached to the steerable axle;

a steering wheel operable to control the pair of front wheels;

a pair of rear wheels attached to the rear axle;

a motor in electrical communication with the battery and the steerable axle and/or rear axle, the motor operable to rotate the pair of front wheels and/or the pair of rear wheels;

one or more body panels operable to be removably attached to the tubular frame; and one or more attachable accessories operable to be removably attached to the tubular frame.

2. The vehicle of claim 1, wherein the solar panel system includes a top portion covering the roof frame and two curved portions extending radially outward from the top portion and down towards the base frame.

3. The vehicle of claim 1, wherein the battery assembly is removable and hot-swappable.

4. The vehicle of claim 1, wherein the one or more body panels comprise one or more attachment mechanisms operable to removably couple the one or more body panels to the tubular frame.

5. The vehicle of claim 4, wherein the one or more attachment mechanisms are one or more clamps configured to removably couple to the tubular frame.

6. The vehicle of claim 1, the vehicle further comprising a windshield attached to the body frame.

7. The vehicle of claim 6, wherein the battery assembly is secured to the base plate in front of the windshield.

8. The vehicle of claim 6, the vehicle further comprising at least one seat extending upward from the base plate behind the windshield.

9. The vehicle of claim 1, wherein the sealing case encloses the battery, a battery control unit, a vehicle control unit, a solar inverter, an on board charger, and a low voltage inverter.

10. The vehicle of claim 1, the vehicle further comprising one or more wheel covers removably coupled to the vehicle and operable to cover the pair of front wheels and the pair of rear wheels.

11. The vehicle of claim 1, the vehicle further comprising a gear shift lever located on a dashboard in a horizontal orientation and in communication with the motor, the gear shift lever operable to shift the motor between two or more gears.

12. The vehicle of claim 1, the vehicle further comprising an adjustable rearview mirror attached to the roof frame and adjustable along a vertical curvilinear path.

13. A vehicle comprising:

a tubular frame comprising:

a base frame;

a body frame extending vertically from the base frame; and a roof frame extending horizontally from the body frame;

a base plate operable to be attached to the base frame;

a rear axle and a steerable axle operably coupled to the base plate and/or the base frame;

a battery assembly comprising a sealing case and a battery within the sealing case, the battery assembly operable to be removably secured to the base plate, wherein the battery assembly is removable and hot-swappable;

a solar panel system removably attached to the roof frame, the solar panel system extending radially outward from the roof frame and in electrical communication with the battery, wherein the solar panel system includes a top portion covering the roof frame and two curved portions extending radially outward from the top portion and down towards the base frame;

a pair of front wheels attached to the steerable axle;

a steering wheel operable to control the pair of front wheels;

a pair of rear wheels attached to the rear axle;

a motor in communication with the battery and the steerable axle and/or rear axle, the motor operable to rotate the pair of front wheels and/or the pair of rear wheels;

one or more body panels operable to be removably attached to the tubular frame; and one or more attachable accessories operable to be removably attached to the tubular frame.

14. The vehicle of claim 13, wherein the one or more body panels comprise one or more attachment mechanisms operable to removably couple the one or more body panels to the tubular frame.

15. The vehicle of claim 14, wherein the one or more attachment mechanisms are one or more clamps configured to removably couple to the tubular frame.

16. The vehicle of claim 13, the vehicle further comprising a windshield attached to the body frame.

17. The vehicle of claim 16, wherein the battery assembly is secured to the base plate in front of the windshield.

18. The vehicle of claim 13, the vehicle further comprising one or more wheel covers, wherein the one or more wheel covers are operable to be removably coupled to the vehicle.

19. The vehicle of claim 17, the vehicle further comprising a gear shift lever located near the windshield and in communication with the motor, the gear shift lever operable to shift the motor between two or more gears.

20. The vehicle of claim 13, the vehicle further comprising an adjustable rearview mirror attached to the roof frame and adjustable along a vertical curvilinear path.

* * * * *